(12) United States Patent
Ishii

(10) Patent No.: US 8,031,727 B2
(45) Date of Patent: Oct. 4, 2011

(54) WIRELESS NETWORK SYSTEM

(75) Inventor: Yosuke Ishii, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 883 days.

(21) Appl. No.: 11/982,076

(22) Filed: Nov. 1, 2007

(65) Prior Publication Data

US 2008/0240027 A1  Oct. 2, 2008

(30) Foreign Application Priority Data

Nov. 2, 2006  (JP) .................. 2006-298793

(51) Int. Cl.
*H04L 12/56* (2006.01)
*H04J 1/16* (2006.01)
(52) U.S. Cl. ......... 370/401; 370/252; 370/352; 370/466
(58) Field of Classification Search .............. 370/252, 370/352–356, 401, 466
See application file for complete search history.

(56) References Cited

U.S. PATENT DOCUMENTS

| 6,807,165 | B2 * | 10/2004 | Belcea ................. | 370/347 |
| 7,701,858 | B2 * | 4/2010 | Werb et al. ............ | 370/241 |
| 2004/0165570 | A1 | 8/2004 | Lee | |
| 2009/0245236 | A1 * | 10/2009 | Scott et al. ............ | 370/352 |

FOREIGN PATENT DOCUMENTS

| CN | 1518300 A | 8/2004 |
| JP | 2000-196674 | 7/2000 |
| JP | 2003-258704 | 9/2003 |
| JP | 2004-514339 | 5/2004 |
| JP | 2005-79827 A | 3/2005 |
| JP | 2005-167609 | 6/2005 |
| JP | 2005-268988 | 9/2005 |
| JP | 2006081163 A | 3/2006 |

OTHER PUBLICATIONS

First Office Action issued in counterpart Chinese Application No. 2007101655462 dated Jan. 22, 2010, English Translation.
Japanese Office Action corresponding to Japanese Patent Application No. 2006-298793, dated May 26, 2011.
Seiichi Hiraoka, et al., "Ubiquitous Access Network Technique", Mitsubishi-Denki technical report, vol. 79, No. 7, Mitsubishi Denki Engineering Kabushiki Kaisha, Jul. 25, 2005, pp. 57-60.
Office Action dated Mar. 24, 2011, in counterpart Japanese Application No. 2006-298793.

* cited by examiner

*Primary Examiner* — John Pezzlo
(74) *Attorney, Agent, or Firm* — Sughrue Mion, PLLC

(57) ABSTRACT

In a wireless network system for interconnecting a wireless network and another network different from the wireless network, the wireless network system includes: a plurality of wireless nodes for establishing the wireless network; a control device connected to the other network; and a plurality of gateways for interconnecting the wireless network and the other network, wherein the wireless node searches a path from a gateway candidate list, selects a gateway on an optimal path based on information collected in searching the path, and transfers data to the control device through the gateway on the optimal path.

14 Claims, 19 Drawing Sheets

WIRELESS NETWORK SYSTEM

This application is based on and claims priority from Japanese Patent Application No. 2006-298793, filed on Nov. 2, 2006, the entire contents of which are hereby incorporated by reference.

BACKGROUND OF THE INVENTION

1. Technical Field

The present disclosure relates to a wireless network system for interconnecting a wireless network and another network different from the wireless network, and more particularly to a wireless network system for selecting an optimum one of a plurality of gateways, thereby enabling an interconnection between networks.

2. Related Art

The related-art documents related to a wireless network system for interconnecting a conventional wireless network and another network different from the conventional wireless network are as follows:
Japanese Patent Unexamined Documents: JP-A-2000-196674, JP-A-2003-258704, JP-T-2004-514339, JP-A-2005-167609 and JP-A-2005-268988.

FIG. 6 is a block diagram showing an example of a conventional wireless network system. In FIG. 6, wireless nodes 1, 2, 3, 4, 5 and 6 establish a mesh type of a wireless network and carry out a communication through the wireless network, A gateway 7 interconnects the wireless network to an Internet Protocol (IP) network, A control device 8 such as a computer carries out a communication through the IP network, and an IP network 100 is shown.

The wireless node 1 is interconnected to adjacent wireless nodes 3, 4 and 2 using wireless lines "WN01", "WN02" and "WN03" as shown in FIG. 6. Similarly, wireless nodes 2, 3, 4, 5 and 6 are also interconnected to the adjacent wireless nodes properly using wireless lines "WN04", "WN05", "WN07", "WN08" and "WN09" as shown in FIG. 6.

Furthermore, the wireless nodes 2, 4 and 6 are interconnected to the gateway 7 using wireless lines "WN10", "WN11" and "WN12" as shown in FIG. 6, respectively. Then, a wireless network shown in a broken line of FIG. 6 is established.

In addition, the gateway 7 is interconnected to the IP network 100, and also the control device 8 is interconnected to the IP network 100.

Moreover, FIG. 7 is a block diagram showing a specific example of the wireless node. In FIG. 7, wireless communication means 9 carries out a communication through a wireless network (a wireless line), calculation control means 10 controls a whole wireless node such as a Central Processing Unit (CPU), storing means 11 stores data and information for a communication path search, and storing means 12 stores a program to control the wireless node. Furthermore, the wireless communication means 9, the calculation control means 10, the storing means 11 and storing means 12 constitute a wireless node 50.

The wireless communication means 9 is interconnected to a wireless network (a wireless line), and an input/output of the wireless communication means 9 is interconnected to the calculation control means 10. Moreover, the storing means 11 and the storing means 12 are also interconnected to the calculation control means 10.

The calculation control means 10 reads and executes a stored program from the storing means 12 to control the whole wireless node, and the wireless communication means 9 is controlled based on information stored in the storing means 11 to establish a wireless network together with the adjacent wireless node, thereby transferring data from each other. Thus, the calculation control means 10 is operated as the wireless node.

FIG. 8 is a block diagram showing a specific example of the gateway. In FIG. 8, wireless communication means 13 carries out a communication through a wireless network (a wireless line), calculation control means 14 controls a whole gateway such as a CPU, communication means 15 carries out a communication through an IP network (not shown), storing means 16 stores a program to control the gateway, and storing means 17 stores information for a protocol conversion. Moreover, the wireless communication means 13, the calculation control means 14, the communication means 15, the storing means 16 and the storing means 17 constitute a gateway 51.

The wireless communication means 13 is interconnected to a wireless network (a wireless line), and an input/output of the wireless communication means 13 is interconnected to the calculation control means 14. Moreover, the communication means 15 is interconnected to the IP network and has an input/output interconnected to the calculation control means 14. Furthermore, the storing means 16 and the storing means 17 are interconnected to the calculation control means 14.

The calculation control means 14 reads and executes the program stored in the storing means 16 to control the whole gateway, and controls the wireless communication means 13 based on the information stored in the storing means 17 to establish a wireless network together with the adjacent wireless node, thereby transferring data from each other. On the other hand, the calculation control means 14 controls the communication means 15 to carry out a data transfer together with the IP network 100.

Furthermore, the calculation control means 14 converts a protocol of data received through the wireless communication means 13 or the communication means 15 based on the information for a protocol conversion which is stored in the storing means 17 and transfers the data subjected to the protocol conversion through the communication means 15 or the wireless communication means 13. Thus, the calculation control means 14 is operated as the gateway.

An operation according to the conventional example shown in FIG. 6 will be described with reference to FIGS. 9, 10, 11 and 12. FIG. 9 is a flowchart for explaining an operation of each wireless node, FIGS. 10 and 12 are diagrams for explaining a data transfer, and FIG. 11 is a flowchart for explaining an operation of the gateway 7.

At "S001" in FIG. 9, the wireless node (more specifically, the calculation control means 10) determines whether to transfer data to the control device 8 (the IP node) through the IP network 100.

At "S001" in FIG. 9, if the wireless node determines to transfer the data, the wireless node (more specifically, the calculation control means 10) searches a transfer path to the gateway 7 and establishes a transfer path at "S002" in FIG. 9 and the wireless node (more specifically, the calculation control means 10) transfers the data to the gateway 7 using the established transfer path at "S003" in FIG. 9.

For example, if the wireless node 1 (more specifically, the calculation control means in the wireless node 1) determines to transfer the data, the wireless node 1 searches and establishes a transfer path using wireless lines "WN02" and "WN11" in FIG. 10 and the wireless node 1 (more specifically, the calculation control means in the wireless node 1) transfers the data to the gateway 7 as shown in "SD21" of FIG. 10.

Meanwhile, at "S101" in FIG. 11, the gateway 7 (more specifically, the calculation control means 14) determines whether the data is received through a wireless network or not.

At "S101" in FIG. 11, if the gateway 7 determines that the data is received through the wireless network, the gateway 7 (more specifically, the calculation control means 14) converts a protocol of the received data at "S102" in FIG. 11 and the gateway 7 (more specifically, the calculation control means 14) transfers the data to the control device 8 (the IP node) through the IP network 100 at "S103" in FIG. 11.

For example, if the gateway 7 (more specifically, the calculation control means in the gateway 7) determines that the date is received, the gateway 7 (more specifically, the calculation control means in the gateway 7) transfers the data to the control device 8 through the IP network 100 as shown in "SD31" of FIG. 12.

As a result, it is possible to interconnect a wireless network and another network different from the wireless network by providing the gateway between the wireless network and the IP network, converting the protocol of the received data and transferring the data subjected to the protocol conversion through the gateway.

Moreover, FIG. 13 is a block diagram showing another example of the conventional wireless network system, in which the gateway is particularly doubled. In FIG. 13, 1 to 6 and 8 are the same reference numerals as those in FIG. 6, and a gateway 18 (Primary Gateway) for a normal operation interconnects a wireless network and an IP network, a gateway 19 (Secondary Gateway) for a backup interconnects the wireless network to the IP network, and a IP network 101 is shown.

The wireless node 1 is interconnected to adjacent wireless nodes 3, 4 and 2 using wireless lines "WN41", "WN42" and "WN43" in FIG. 13. Similarly, wireless nodes 2, 3, 4, 5 and 6 are also interconnected to the adjacent wireless nodes by properly using wireless lines "WN44", "WN45", "WN46", "WN47", "WN48" and "WN49" in FIG. 13.

Furthermore, the wireless nodes 2, 4 and 6 are interconnected to the gateway 18 using wireless lines "WN50", "WN52" and "WN54" in FIG. 13 respectively, and the wireless nodes 2, 4 and 6 are interconnected to the gateway 19 using wireless lines "WN51", "WN53" and "WN55" in FIG. 13 respectively. Thus, a wireless network shown in a broken line of FIG. 13 is established.

In addition, the gateways 18 and 19 are interconnected to the IP network 101, and also the control device 8 is interconnected to the IP network 101.

An operation according to the conventional example shown in FIG. 13 will be described with reference to FIGS. 14, 15, 16, 17, 18 and 19. FIG. 14 is a flowchart for explaining an operation of each wireless node. FIGS. 15, 17 and 19 are diagrams for explaining a data transfer. FIG. 16 is a flowchart for explaining an operation of the gateway 18 for a normal operation. FIG. 18 is a flowchart for explaining an operation of the gateway 19 for a backup.

It is assumed that the gateway 18 for a normal operation and the gateway 19 for a backup are treated as an identical network address. Moreover, it is assumed that specific structures of the wireless nodes 1 to 6 and the gateways 18 and 19 are the same as those in FIGS. 7 and 8.

At "S201" in FIG. 14, the wireless node (more specifically, the calculation control means 10) determines whether to transfer the data to the control device 8 (the IP node) through the IP network 101 or not.

At "S201" in FIG. 14, if the wireless node determines to transfer the data, the wireless node (more specifically, the calculation control means 10) searches a transfer path to the gateway 18 for a normal operation and establishes the transfer path at "S202" in FIG. 14 and the wireless node (more specifically, the calculation control means 10) transfers the data to the gateway 18 for a normal operation using the established transfer path at "S203" in FIG. 14.

For example, if the wireless node 1 (more specifically, the calculation control means in the wireless node 1) determines to transfer the data, the wireless node 1 (more specifically, the calculation control means in the wireless node 1) searches and establishes a transfer path using wireless lines "WN42" and "WN52" in FIG. 15, and transfers the data to the gateway 18 for a normal operation as shown at "SD61" in FIG. 15.

As described above, the gateway 18 for a normal operation and the gateway 19 for a backup are treated as the identical network address. Therefore, at the same time, the data are also transferred from the wireless node 1 to the gateway 19 for a backup through wireless lines "WN42" and "WN53" in FIG. 15 as shown in "SD62" in FIG. 15.

Meanwhile, at "S301" in FIG. 16, the gateway 18 for a normal operation (more specifically, the calculation control means 14) determines whether the data is received through a wireless network or not.

At "S301" in FIG. 16, if the gateway 18 determines that the data is received through the wireless network, the gateway 18 for a normal operation (more specifically, the calculation control means 14) converts the protocol of the received data at "S302" in FIG. 16 and the gateway 18 for a normal operation (more specifically, the calculation control means 14) transfers the data to the control device 8 (the IP node) through the IP network 101 at "S303" in FIG. 16.

For example, if the gateway 18 for a normal operation (more specifically, the calculation control means in the gateway 18) determines that the data are received, the gateway 18 for a normal operation (more specifically, the calculation control means in the gateway 18) transfers the data to the control device 8 through the IP network 101 as shown in "SD71" in FIG. 17.

At "S401" in FIG. 18, moreover, the gateway 19 for a backup (more specifically, the calculation control means 14) determines whether the data are received through the wireless network or not.

At "S401" in FIG. 18, if the gateway 19 determines that the data are received through the wireless network, the gateway 19 for a backup (more specifically, the calculation control means 14) determines whether the gateway 18 for a normal operation is in a normal operation or not at "402" in FIG. 18.

At "S402" in FIG. 18, if the gateway 19 determines that the gateway 18 for a normal operation is not in the normal operation (an abnormal operation), the gateway 19 for a backup (more specifically, the calculation control means 14) converts the protocol of the received data at "S403" in FIG. 18 and the gateway 19 for a backup (more specifically, the calculation control means 14) transfers the data through the IP network 101 to the control device 8 (the IP node) at "S404" in FIG. 18.

For example, if the gateway 19 for a backup (more specifically, the calculation control means in the gateway 19) determines that the data are received, the gateway 19 for a backup (more specifically, the calculation control means in the gateway 19) transfers the data to the control device 8 through the IP network 101 as shown in "SD81" of FIG. 19.

As a result, by providing two gateways, that is, the gateway for a normal operation and the gateway for a backup between the wireless network and the IP network, it is possible to double the gateway and to enhance the reliability.

However, in the conventional example shown in FIG. 6, a communication load of the gateway 7 becomes greater because all communications are carried out through the gateway 7. There has been a problem in that the wireless network cannot be interconnected to the IP network when a fault is generated in the gateway 7.

Since an area in which each wireless node can carry out the communication is limited and only one gateway is provided, moreover, there has been a problem in that setting position of the gateway and that of the wireless node are naturally restricted.

In the conventional example shown in FIG. 13, furthermore, a higher reliability than that in the conventional example shown in FIG. 6 is obtained because the gateway is doubled. In the normal operation state, however, all communications are carried out via the gateway 18 for a normal operation in the same manner as in the conventional example shown in FIG. 6. For this reason, a problem of an increase in the communication load cannot be solved.

SUMMARY OF THE INVENTION

Exemplary embodiments provide a wireless network system capable of selecting an optimum one of a plurality of gateways, thereby carrying out an interconnection between networks.

In order to achieve the foregoing object, a first aspect of the present invention is directed to a wireless network system for interconnecting a wireless network and another network different from the wireless network, comprising:

a plurality of wireless nodes for establishing the wireless network;

a control device connected to the other network; and a plurality of gateways for interconnecting the wireless network and the other network, wherein the wireless node searches a path from a gateway candidate list, selects a gateway on an optimal path based on information collected in searching the path, and transfers data to the control device through the gateway on the optimal path.

Consequently, it is possible to select an optimum one of a plurality of gateways, thereby interconnecting the networks. Moreover, it is possible to handle a problem of an increase in a communication load and to enhance the degree of freedom of setting position of the gateway and that of the wireless node.

A second aspect of the present invention is directed to the wireless network system according to the first aspect of the present invention, wherein the wireless node comprises:

wireless communication means for carrying out a communication through the wireless network;

storing means for storing the data, the gateway candidate list, a path search result list, a program for controlling the wireless node and information for searching a communication path; and calculation control means for selecting a gateway candidate to be used from the gateway candidate list, searching a path for the gateway candidate, selecting a gateway on an optimal path based on information collected in searching the path, establishing a transfer path to the gateway on the optimal path, and transferring data to the gateway on the optimal path by using the established transfer path.

Consequently, it is possible to select an optimum one of a plurality of gateways, thereby carrying out an interconnection between the networks. In addition, it is possible to handle a problem of an increase in a communication load and to enhance the degree of freedom of setting position of the gateway and that of the wireless node.

A third aspect of the present invention is directed to the wireless network system according to the second aspect of the invention, wherein the wireless node retransfers data to a gateway on a second optimal path when detecting a failure in the data transfer to the gateway on the optimal path.

Consequently, it is possible to enhance a reliability of a data transfer.

A fourth aspect of the present invention is directed to the wireless network system according to the first aspect of the invention, wherein the gateway comprises:

wireless communication means for carrying out a communication through the wireless network;

storing means for storing a program for controlling the gateway and information for a protocol conversion;

communication means for carrying out a communication through the other network; and calculation control means for converting protocol of data received through the wireless network and transferring the data to the control device via the other network.

Consequently, it is possible to select an optimum one of a plurality of gateways, thereby carrying out an interconnection between the networks. Moreover, it is possible to handle of a problem of an increase in a communication load and to enhance the degree of freedom of setting position of the gateway and that of the wireless node.

A fifth aspect of the present invention is directed to the wireless network system according to the first aspect of the present invention, wherein the other network is an IP network.

Consequently, it is possible to select an optimum one of a plurality of gateways, thereby carrying out an interconnection between the networks. Moreover, it is possible to handle of a problem of an increase in a communication load and to enhance the degree of freedom of setting position of the gateway and that of the wireless node.

A sixth aspect of the present invention is directed to the wireless network system according to the first aspect of the present invention, wherein the wireless network system is applied to a plant control system.

Consequently, it is possible to improve a robustness of the wireless network, thereby enhancing the reliability of the plant control system.

A seventh aspect of the present invention is directed to the wireless network system according to the first aspect of the present invention, wherein the wireless network system is applied to a building automation system.

Consequently, it is possible to improve a robustness of the wireless network, thereby enhancing the reliability of the system.

DETAILED DESCRIPTION OF EXEMPLARY EMBODIMENTS

According to the invention, the following advantages can be obtained:

According to the first, second, fourth and fifth aspects of the present invention, a plurality of gateways are provided between a wireless network and an IP network. Then, a wireless node searches a path from a gateway candidate list, and a gateway on an optimal path is selected to transfer data based on information collected in searching the path. Consequently, it is possible to select an optimum one of a plurality of gateways, thereby carrying out an interconnection between the networks.

Moreover, the wireless node selects a gateway on the optimal path based on a load situation of each gateway in a path search result list. Consequently, the increased communication loads can be distributed into a plurality of gateways, so that a countermeasure can be taken against the increase in the communication load. Furthermore, since the plurality of gateways are disposed, it is possible to enhance the degree of freedom of setting position of the gateway and that of the wireless node.

According to the third aspect of the present invention, furthermore, in the case where a failure is detected in the data transferred to the selected gateway on the optimal path, the data are retransferred to a gateway on a second optimal gateway. Consequently, it is possible to enhance a reliability of a data transfer.

According to the sixth aspect of the invention, by the application to the plant control system, it is possible to improve the robustness of the wireless network and to enhance the reliability of plant control system.

According to the seventh aspect of the invention, by the application to the building automation system, it is possible to improve the robustness of the wireless network and to enhance the reliability of the system.

Figure 1:
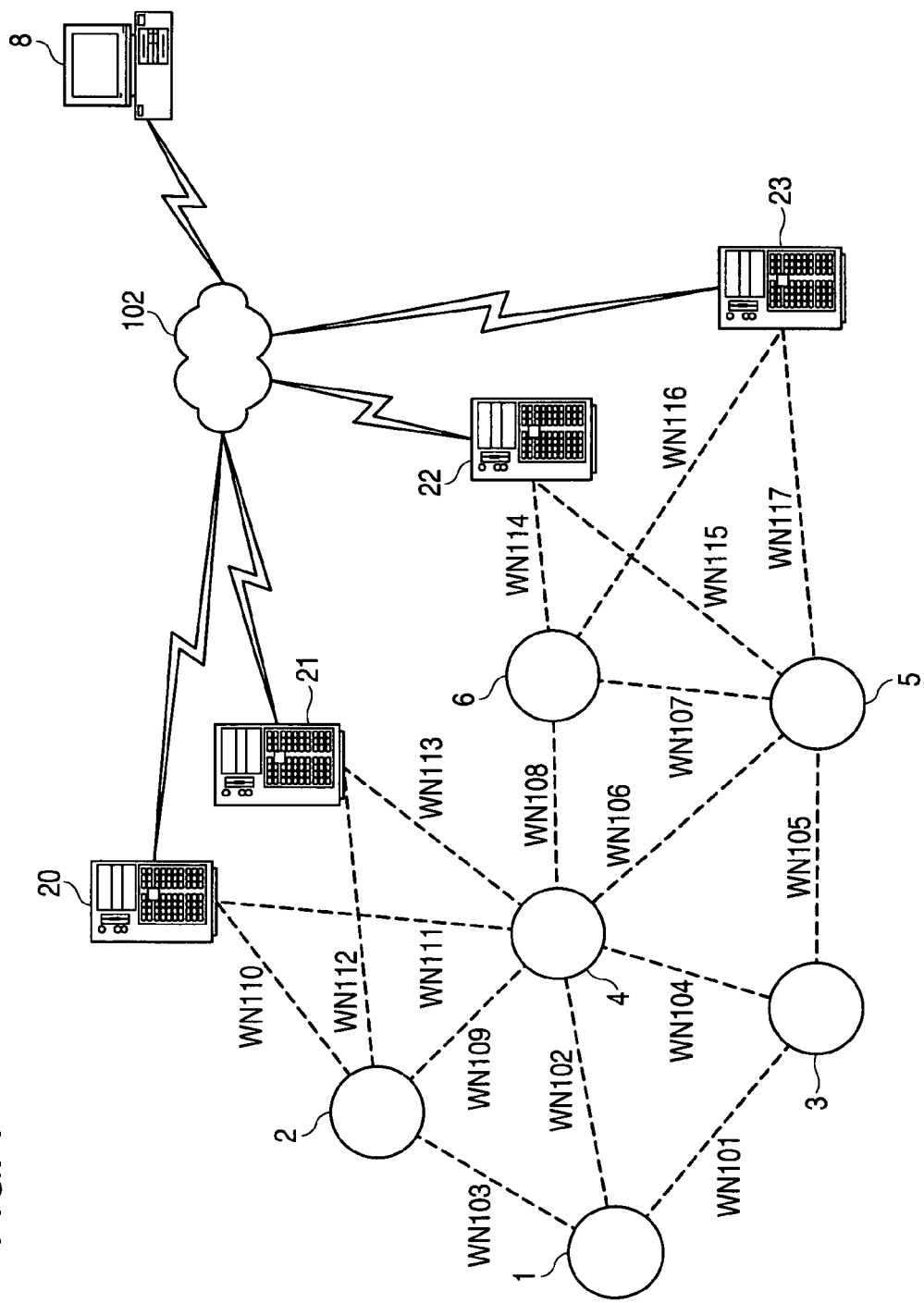
FIG. 1 is a block diagram showing an example of a wireless network system in accordance with the present invention.
Figure 13:
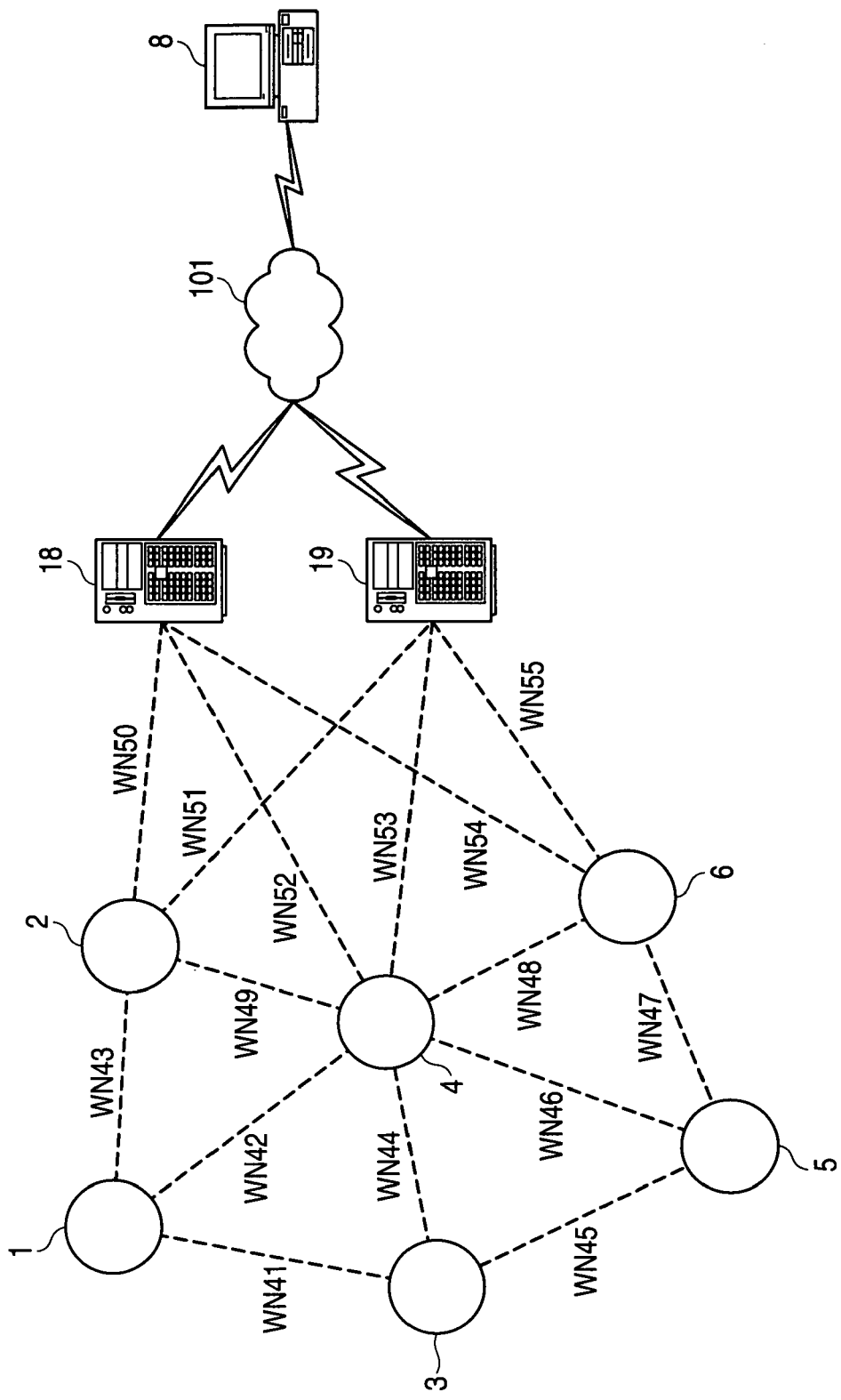
FIG. 13 is a block diagram showing another example of a conventional wireless network system.
Figure 14:
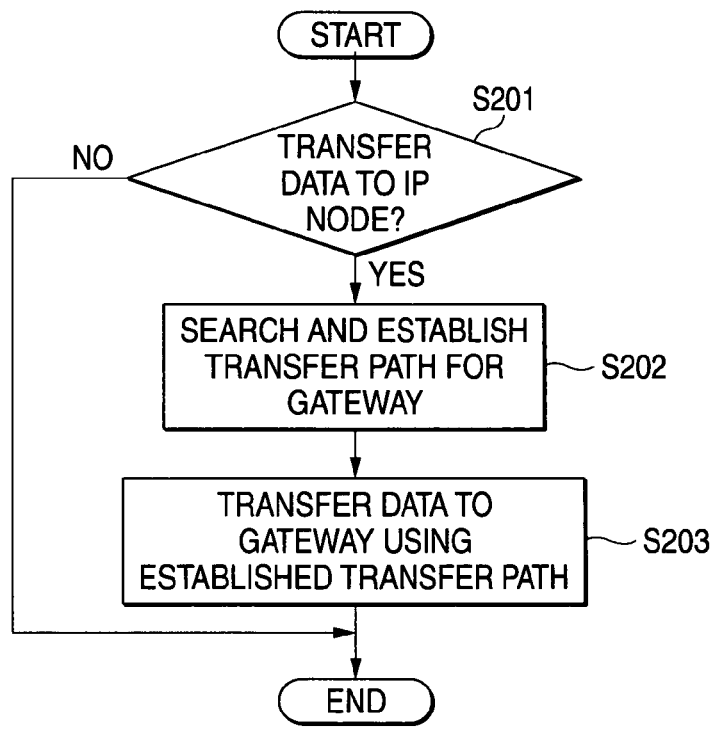
FIG. 14 is a flowchart for explaining an operation of each wireless node.
Figure 15:
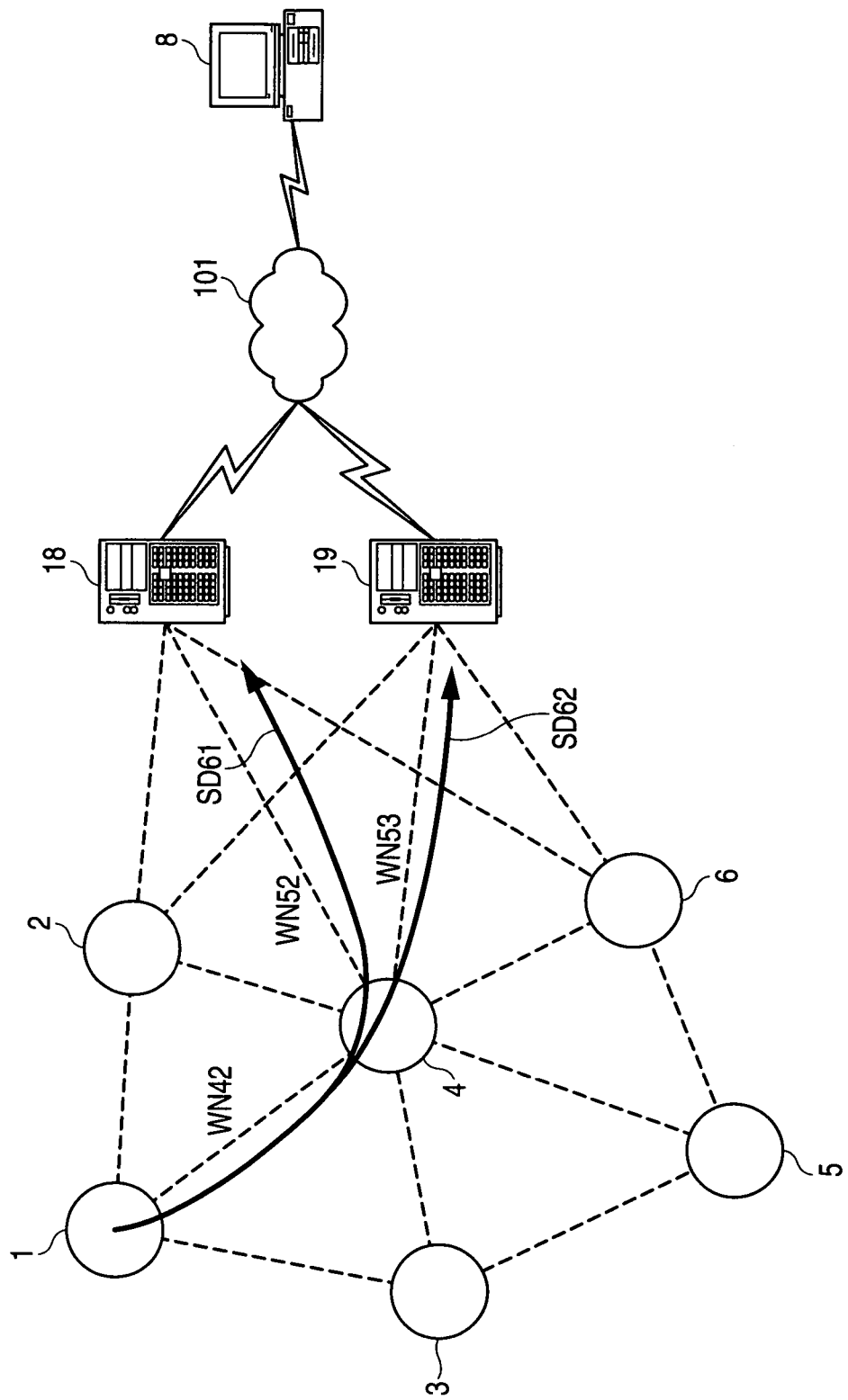
FIG. 15 is a diagram for explaining a data transfer.
Figure 16:
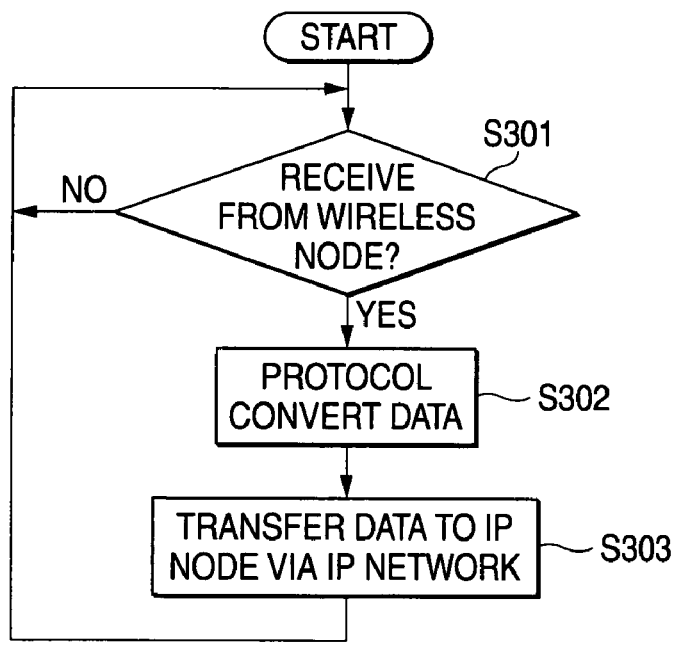
FIG. 16 is a flowchart for explaining an operation of a gateway for a normal operation.
Figure 17:
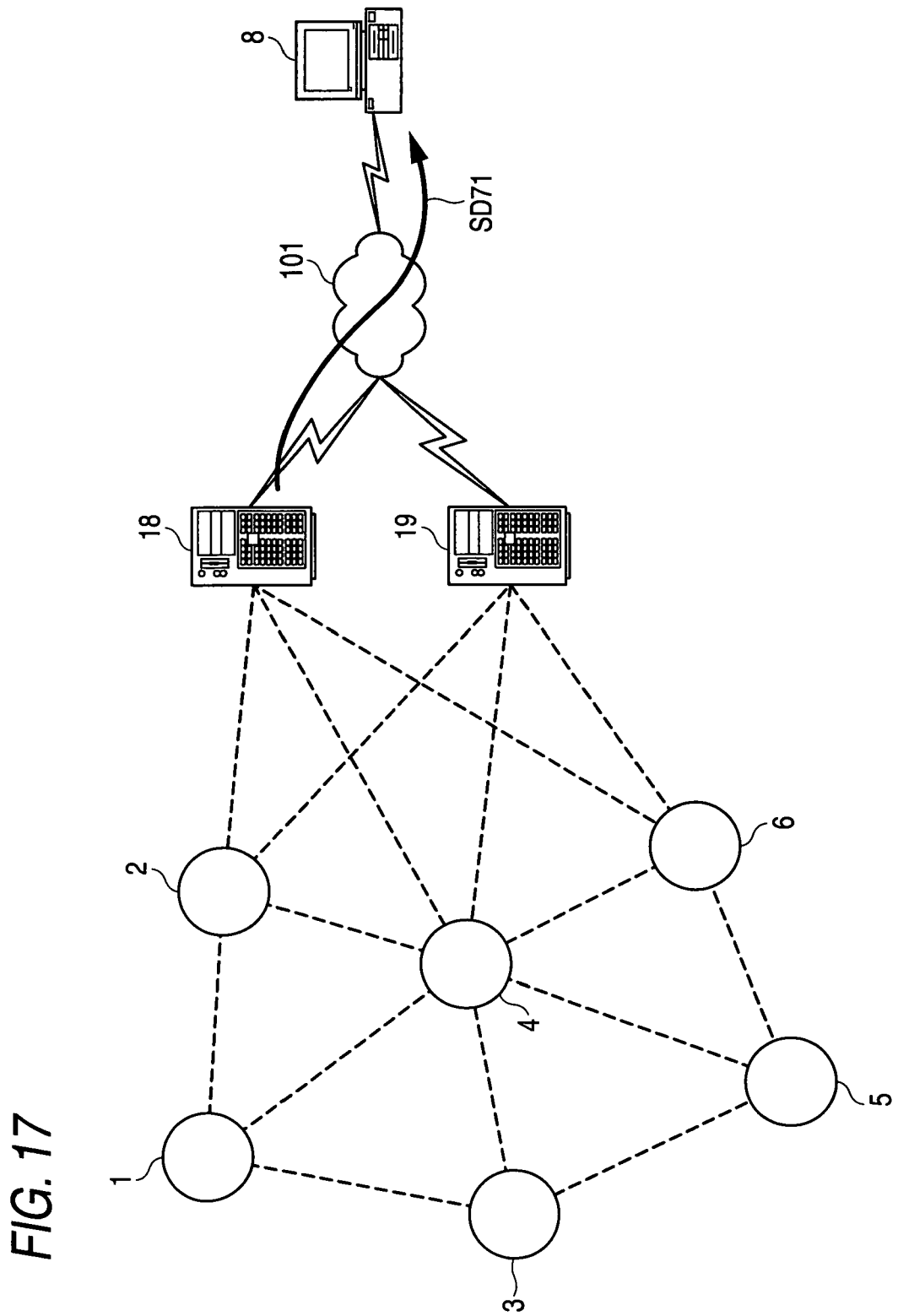
FIG. 17 is a diagram for explaining a data transfer.
Figure 18:
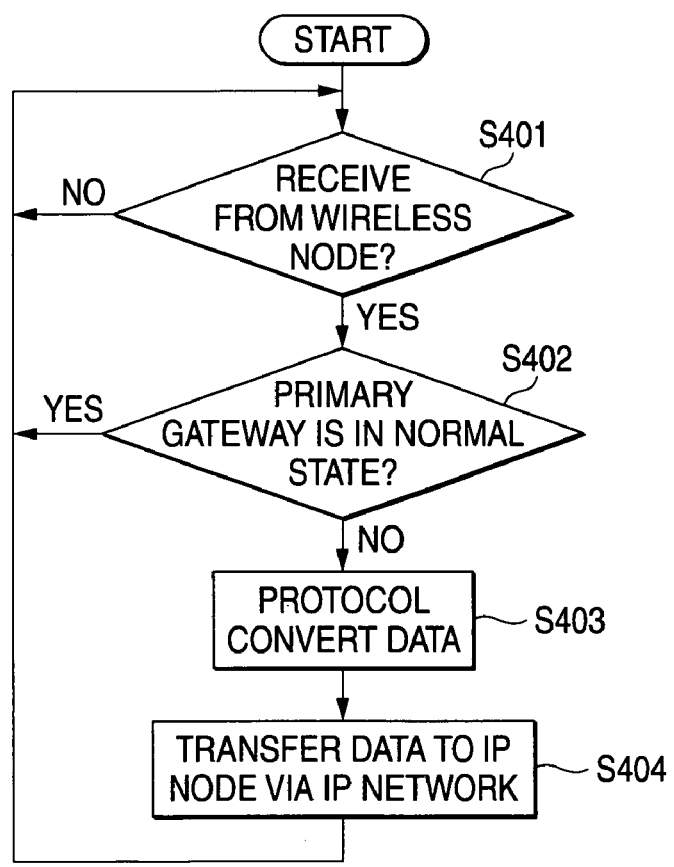
FIG. 18 is a flowchart for explaining an operation of a gateway for a backup.
Figure 19:
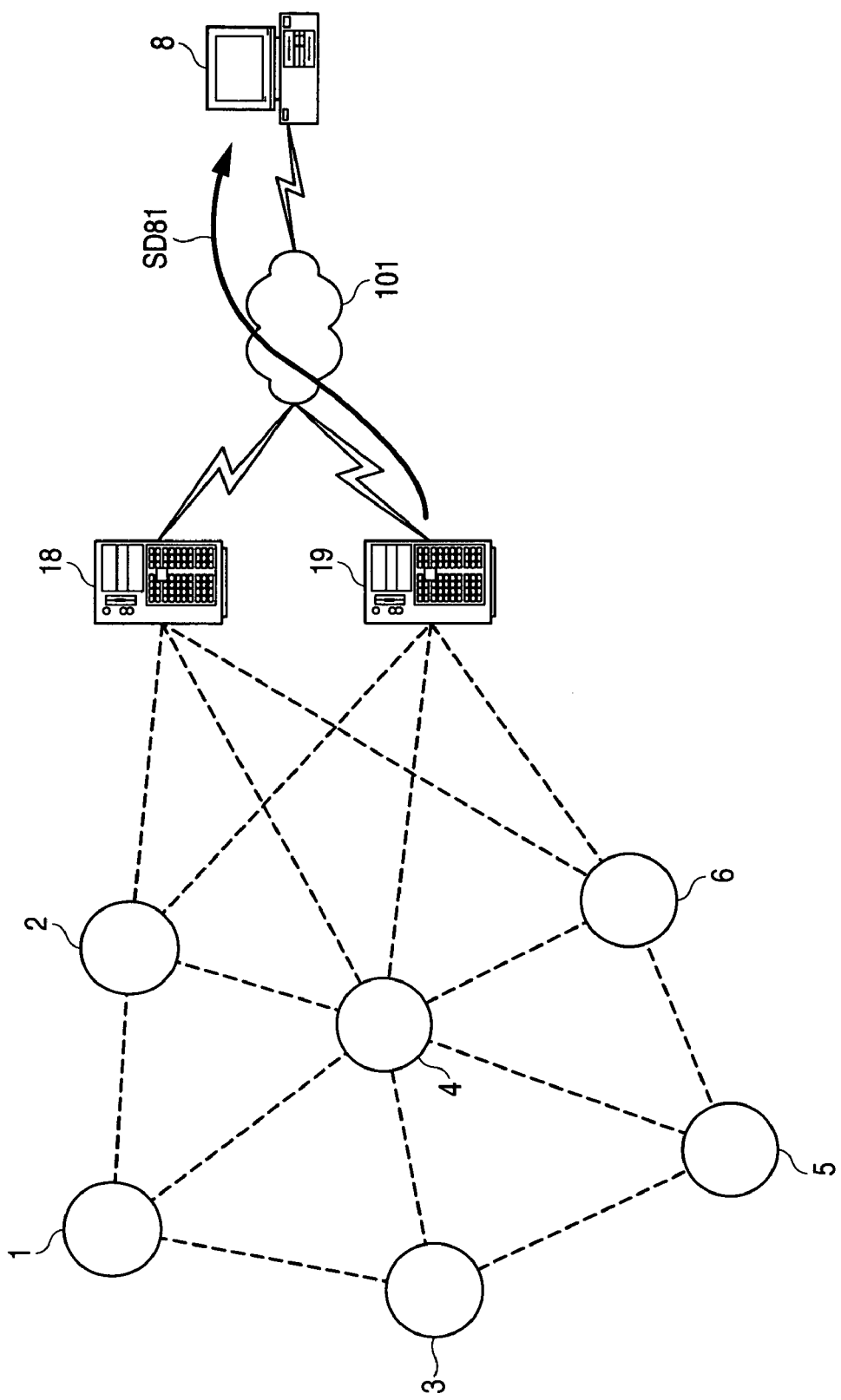
FIG. 19 is a diagram for explaining a data transfer.

The present invention will be described below in detail with reference to the drawings. FIG. 1 is a block diagram showing an example of a wireless network system in accordance with the present invention. In FIG. 1, wireless nodes 1 to 6 and 8 have the same reference numerals as those in FIG. 13, and gateways 20, 21, 22 and 23 interconnect a wireless network to an IP network, and an IP network 102 is shown.

The wireless node 1 is interconnected to adjacent wireless nodes 3, 4 and 2 using wireless lines "WN111", "WN102" and "WN103" in FIG. 1. Similarly, wireless nodes 2, 3, 4, 5 and 6 are also interconnected to the adjacent wireless nodes by properly using wireless lines "WN104", "WN105", "WN106", "WN107", "WN108" and "WN109" in FIG. 1.

Furthermore, the wireless nodes 2 and 4 are interconnected to the gateway 20 using wireless lines "WN110" and "WN111" in FIG. 1 respectively, and the wireless nodes 2 and 4 are interconnected to the gateway 21 using wireless lines "WN112" and "WN113" in FIG. 1 respectively.

Similarly, the wireless nodes 6 and 5 are interconnected to the gateway 22 using wireless lines "WN1114" and "WN1115" in FIG. 1 respectively, and the wireless nodes 6 and 5 are interconnected to the gateway 23 using wireless lines "WN116" and "WN117" in FIG. 1 respectively. Thus, a wireless network shown in a broken line of FIG. 1 is established.

In addition, the gateways 20, 21, 22 and 23 are interconnected to the IP network 102, and also the control device 8 is interconnected to the IP network 102.

Figure 2:
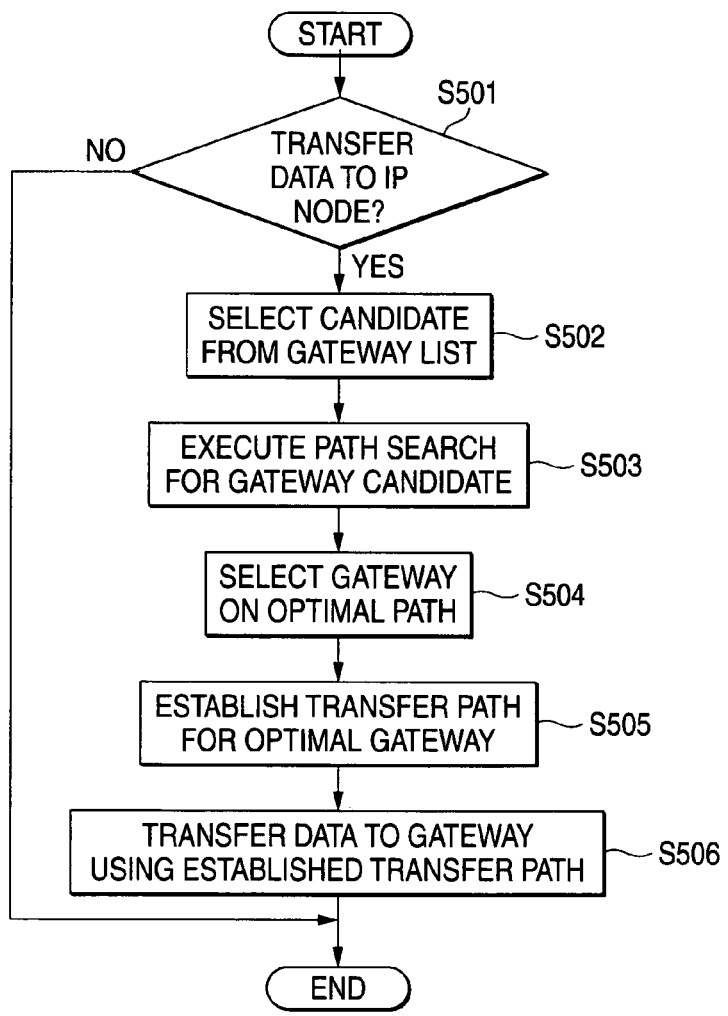
FIG. 2 is a flowchart for explaining an operation of each wireless node.
Figure 3:
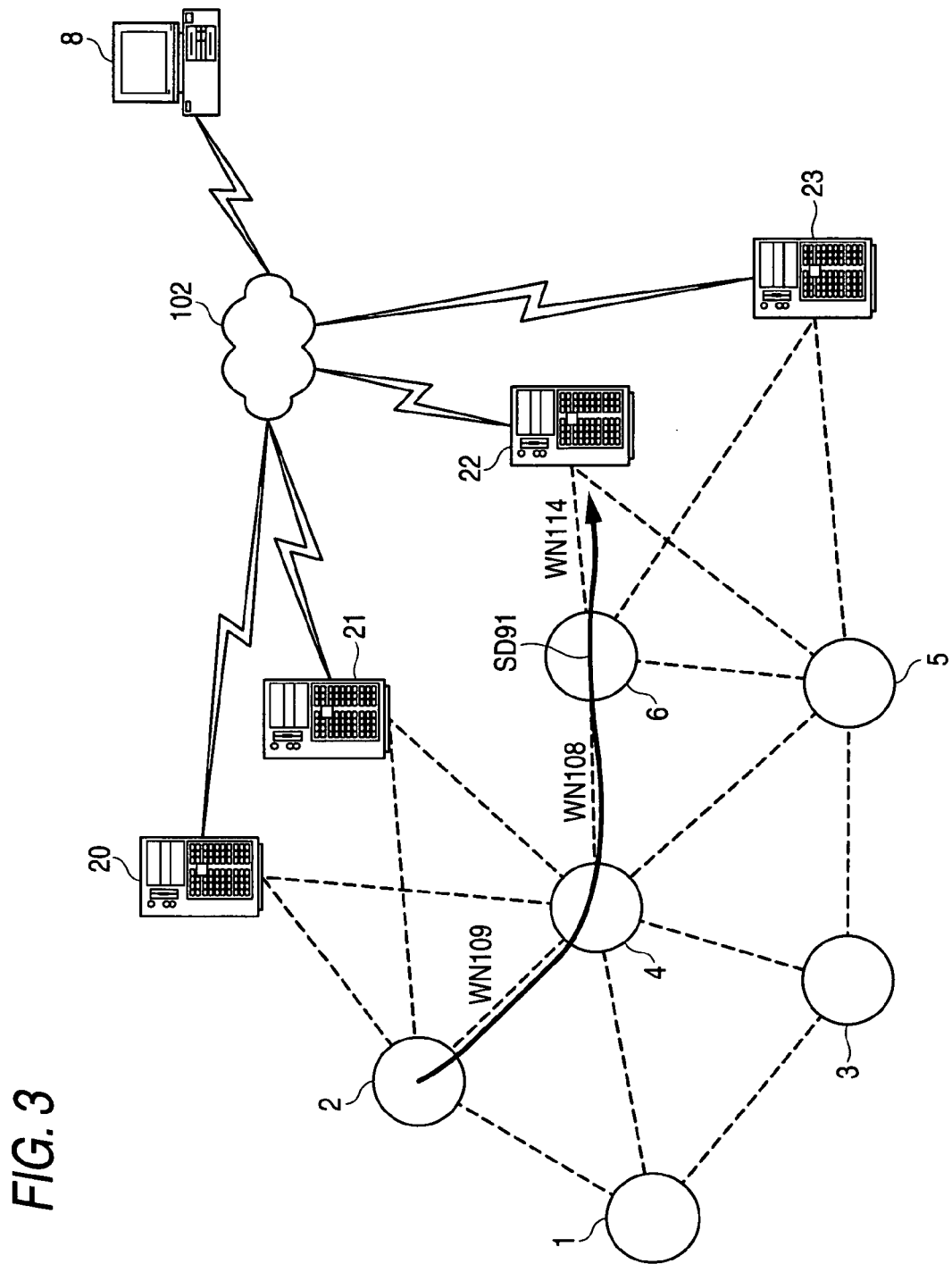
FIG. 3 is a diagram for explaining a data transfer.
Figure 4:
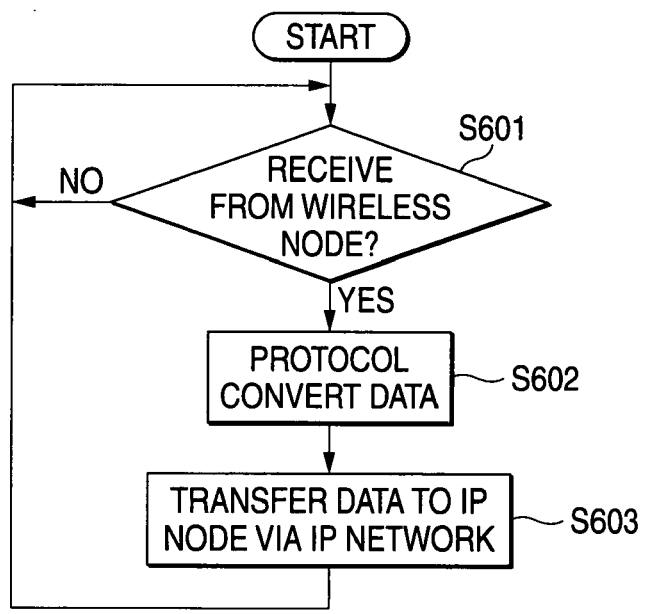
FIG. 4 is a flowchart for explaining an operation of a gateway.
Figure 5:
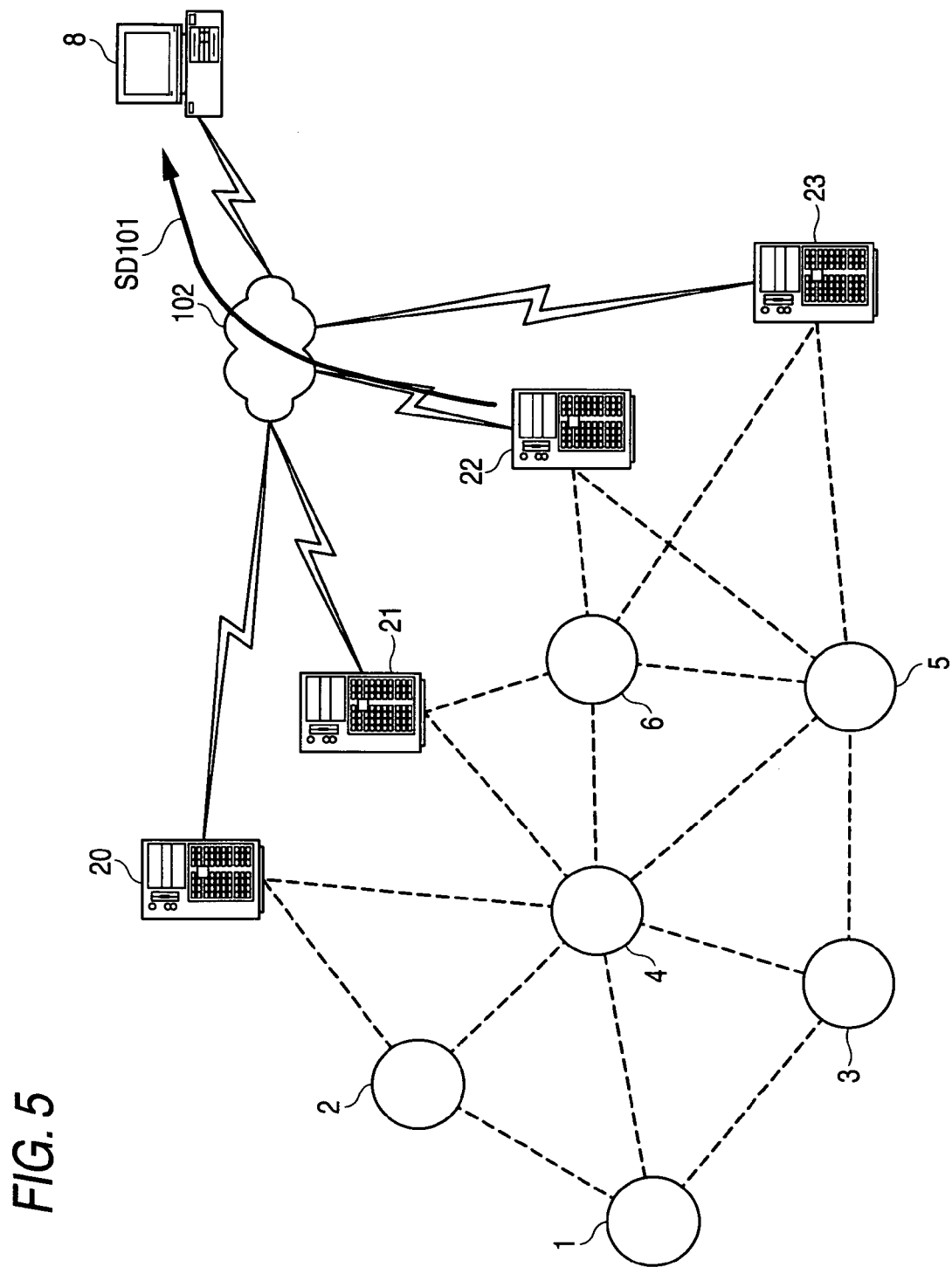
FIG. 5 is a diagram for explaining a data transfer.
Figure 6:
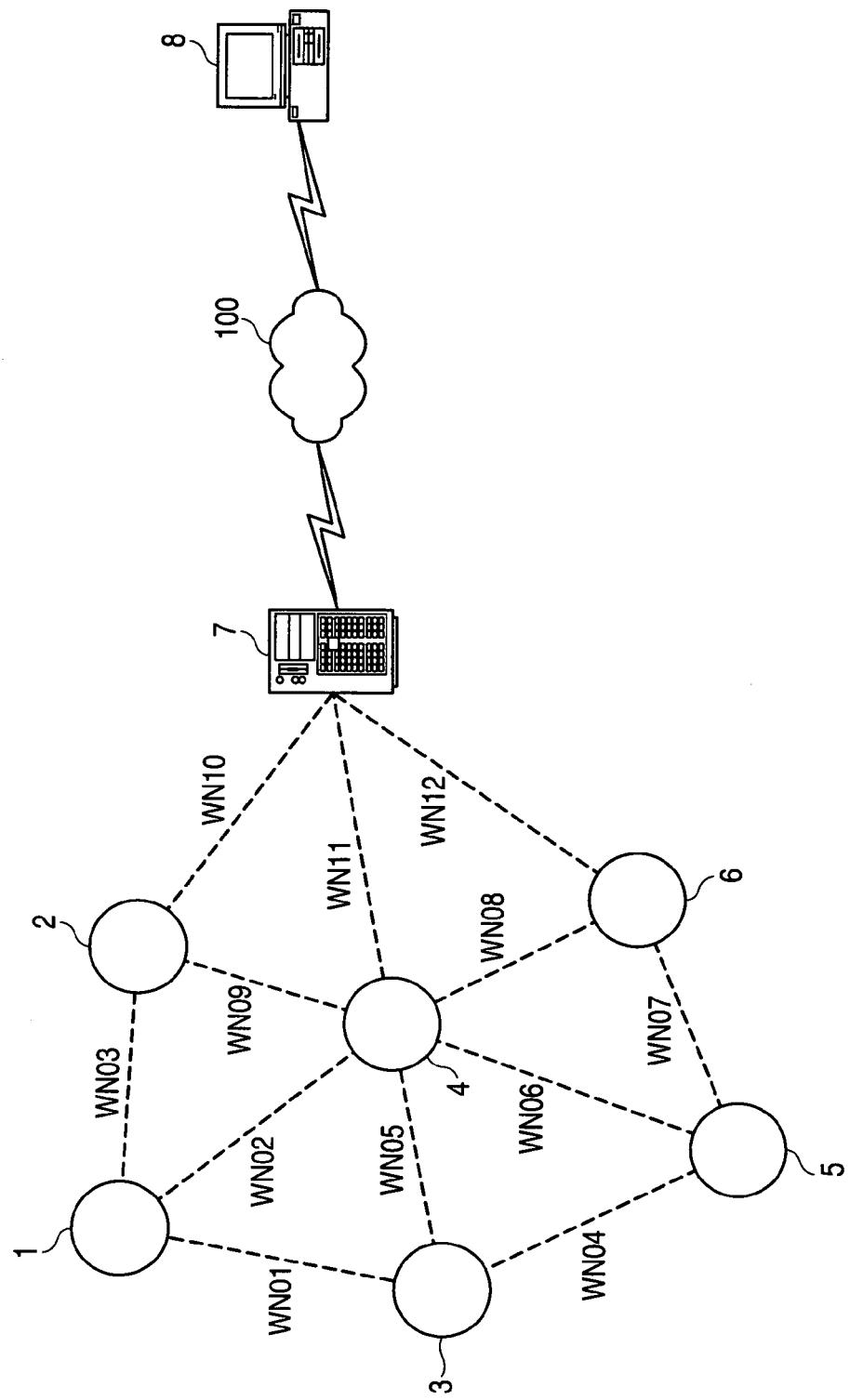
FIG. 6 is a block diagram showing an example of a conventional wireless network system.

An operation according to the example shown in FIG. 1 will be described with reference to FIGS. 2 to 5. FIG. 2 is a flowchart for explaining an operation of each wireless node, FIGS. 3 and 5 are diagrams for explaining a data transfer, and FIG. 4 is a flowchart for explaining an operation of the gateways 20 to 23.

Figure 7:
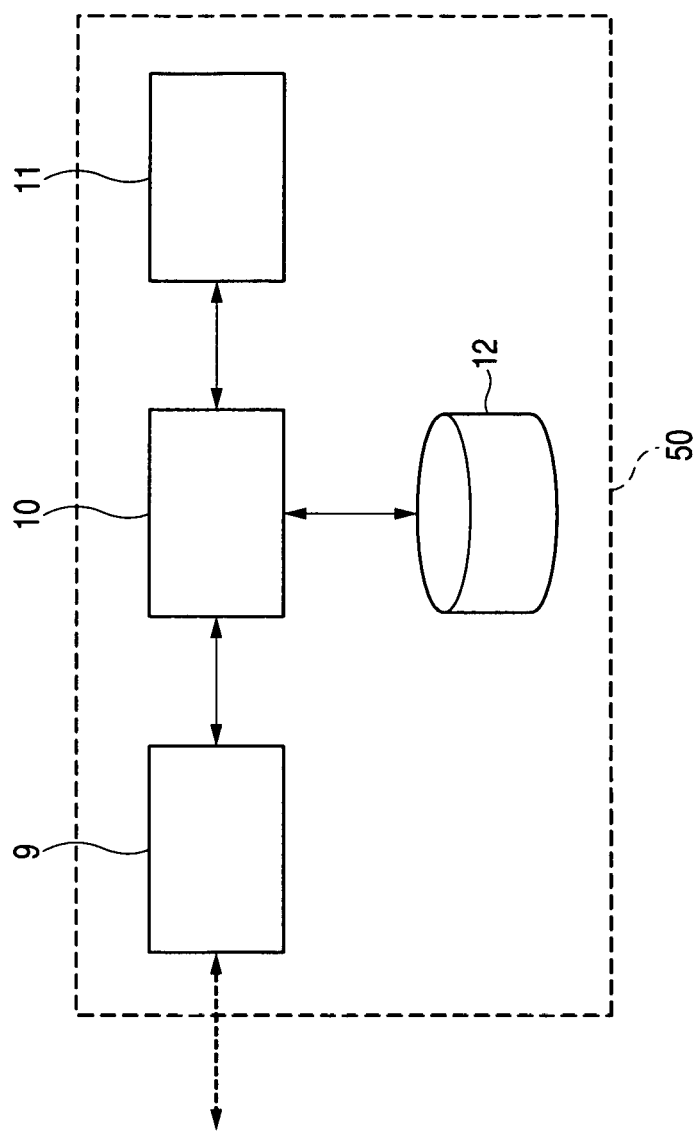
FIG. 7 is a block diagram showing a specific example of the wireless node.
Figure 8:
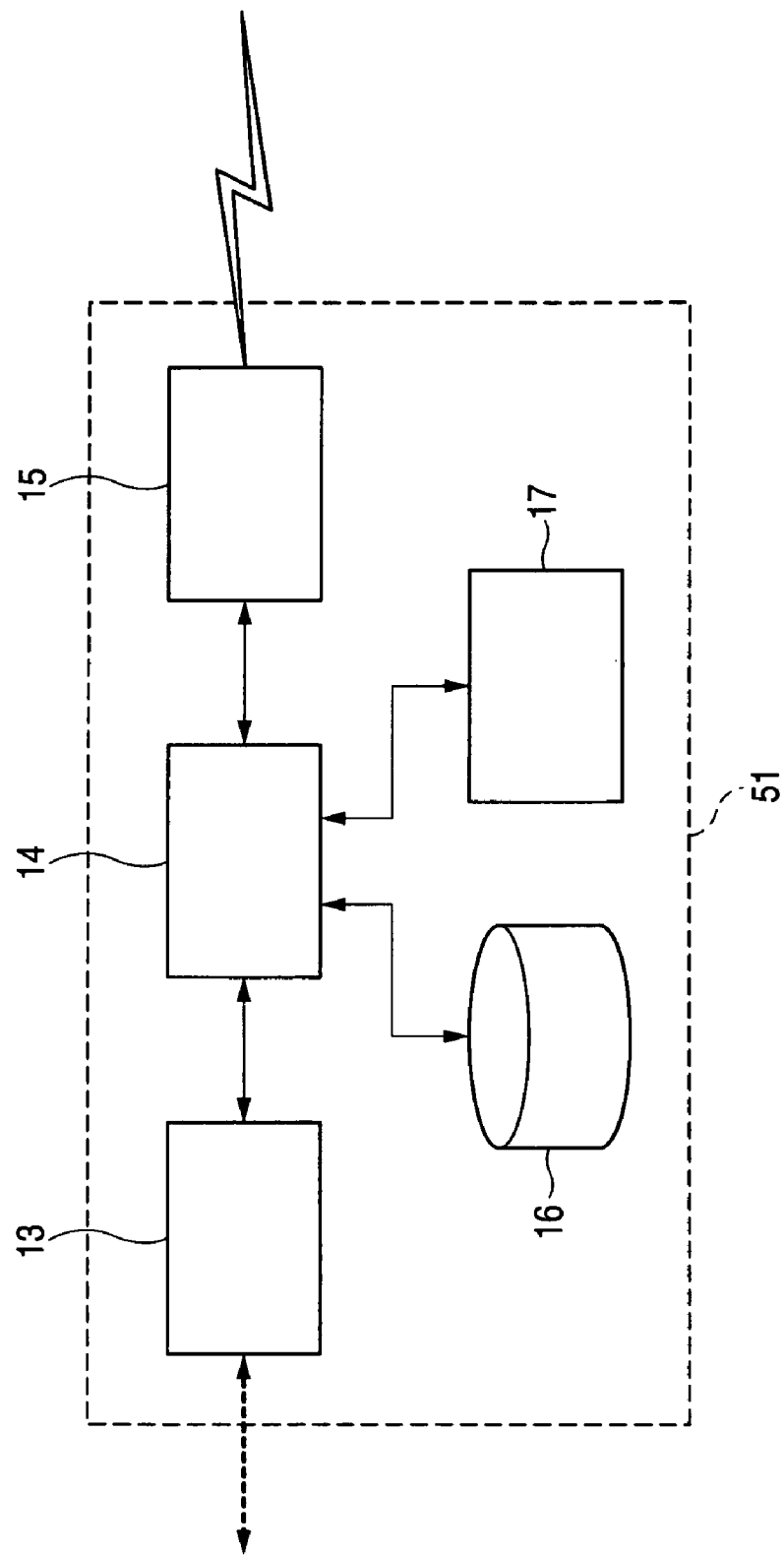
FIG. 8 is a block diagram showing a specific example of the gateway.
Figure 9:
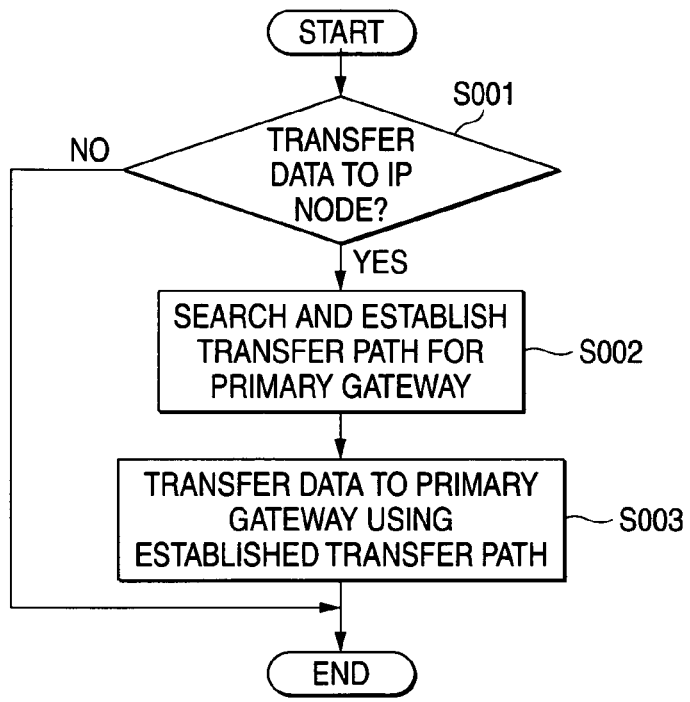
FIG. 9 is a flowchart for explaining an operation of each wireless node.
Figure 10:
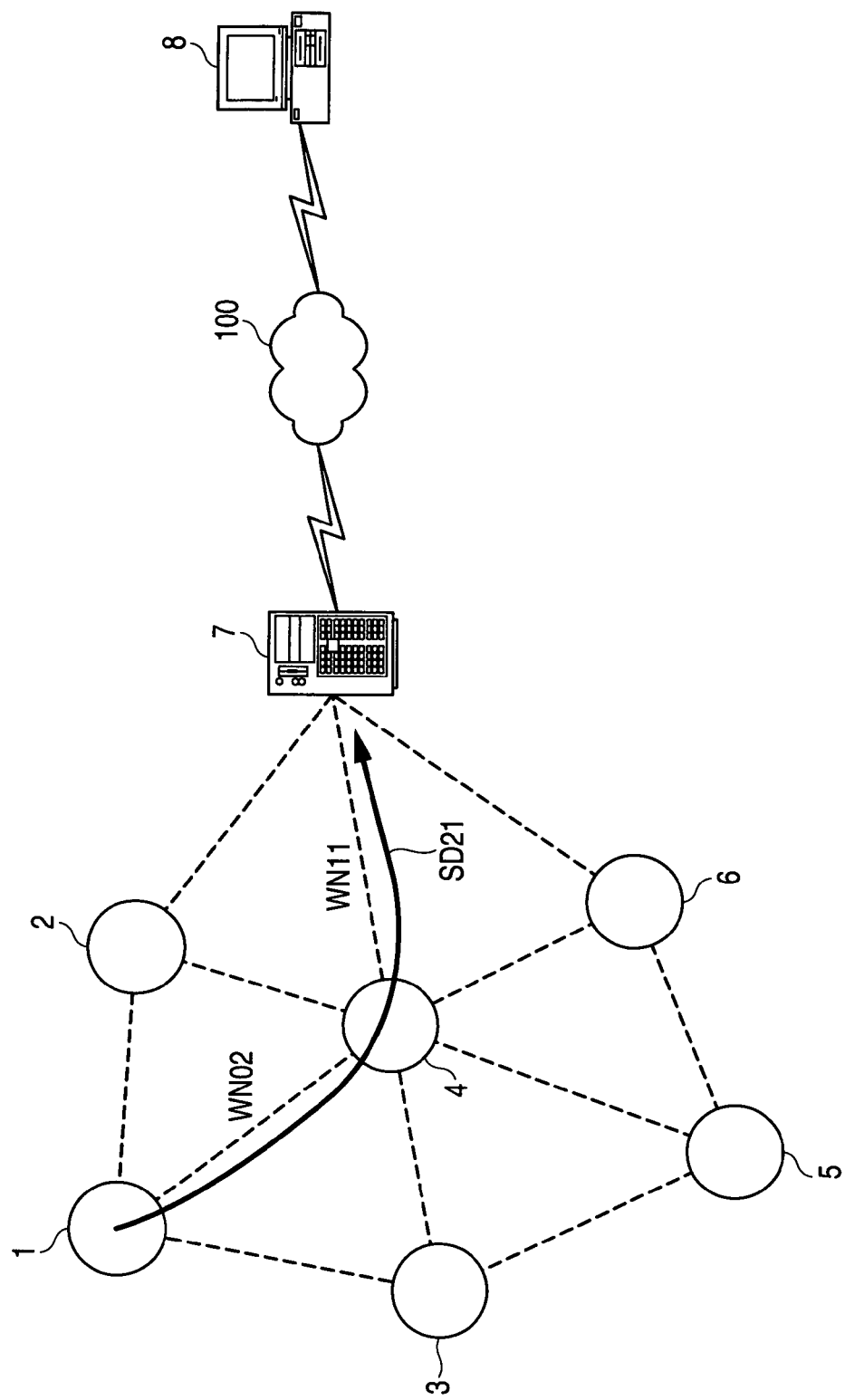
FIG. 10 is a diagram for explaining a data transfer.
Figure 11:
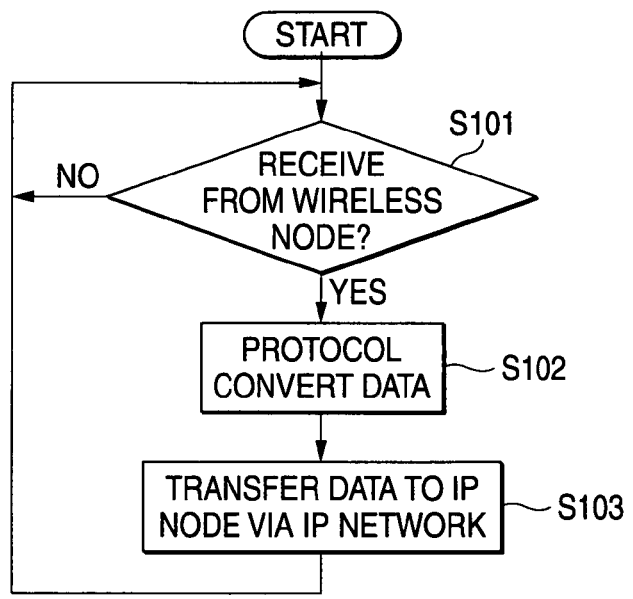
FIG. 11 is a flowchart for explaining an operation of the gateway.
Figure 12:
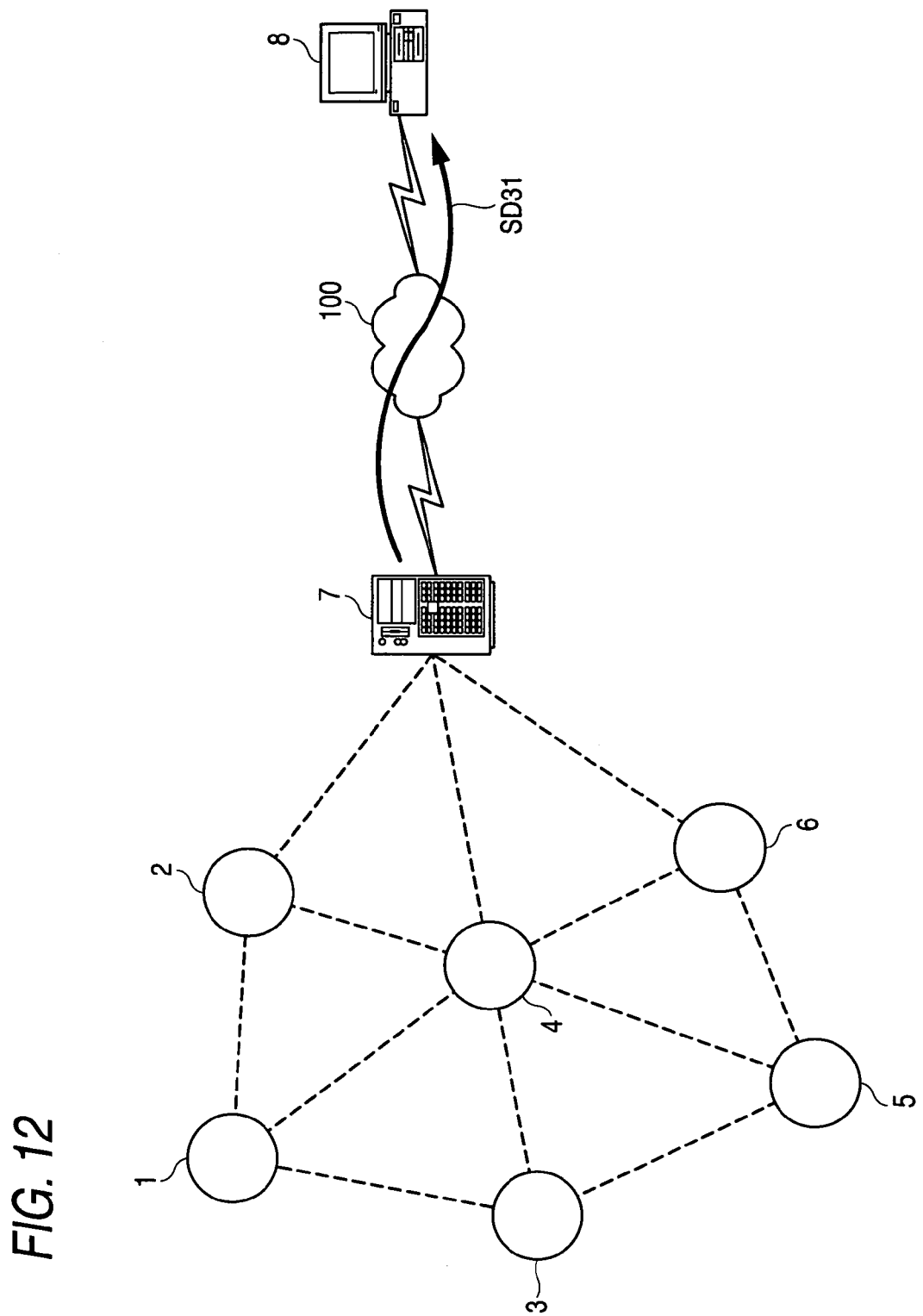
FIG. 12 is a diagram for explaining a data transfer.

It is assumed that specific structures of the wireless nodes 1 to 6 and the gateways 20 to 23 are the same as those in FIGS. 7 and 8 and storing means 11 of the wireless node stores a gateway candidate list and a path search result list in addition to data and information for a communication path search.

At "S501" in FIG. 2, the wireless node (more specifically, calculation control means 10) determines whether to transfer data to a control device 8 (an IP node) through the IP network 102 or not.

At "S501" in FIG. 2, if the wireless node determines to transfer data, the wireless node (more specifically, the calculation control means 10) selects a gateway candidate to be used from the gateway candidate list at "S502" in FIG. 2 and the wireless node (more specifically, the calculation control means 10) searches a path for the gateway candidate at "S503" in FIG. 2.

For example, the calculation control means 10 constituting the wireless node selects a gateway candidate to be used from the gateway candidate list stored in the storing means 11 and searches a path for the gateway candidate, and stores a search result such as the collected information in the path search result list in the storing means 11.

In searching the path, the information stored in the path search result list include "a final destination address", "a next hop address", "a situation of a communication load of a gateway" and "a path cost to a final destination", for example, and an index such as a signal receiving strength, a bit error rate in a radio wave modulation or the number of hops is used for calculating "a path cost to a final destination".

Next, at "S504" in FIG. 2, the wireless node (more specifically, the calculation control means 10) selects a gateway on an optimal path based on the path search result list.

For example, the optimal path means a path in which a communication condition is optimum in a wireless network, and a gateway which can be reached with the smallest number of hops, a gateway on the lowest communication error rate, and a gateway on a small communication load are selected as the gateway on the optimal path.

At "S505" in FIG. 2, the wireless node (more specifically, the calculation control means 10) establishes a transfer path to the gateway on the optimal path. At "S506" in FIG. 2, the wireless node (more specifically, the calculation control means 10) transfers the data to the gateway on the optimal path by using the established transfer path.

For example, if the wireless node 1 (more specifically, the calculation control means in the wireless node 1) determines to transfer the data and also determines that transfer of the data to the gateway 22 through a transfer path using the wireless lines "WN109", "WN108" and "WN114" in FIG. 1 is on the optimal path, a transfer path using the wireless lines "WN109", "WN108" and "WN114" in FIG. 3 is established and the wireless node 1 (more specifically, the calculation control means in the wireless node 1) transfers the data to the gateway 22 as shown in "SD91" of FIG. 3.

Meanwhile, at "S601" in FIG. 4, the gateway 22 determined to be on the optimal path (more specifically, calculation control means 14) determines whether the data are received through a wireless network or not.

At "S601" in FIG. 4, if the gateway 22 determines that the data are received through the wireless network, the gateway 22 (more specifically, the calculation control means 14) converts a protocol of the received data at "S602" in FIG. 4 and the gateway 22 (more specifically, the calculation control means 14) transfers the data to the control device 8 (the IP node) through the IP network 102 at "S603" in FIG. 4.

For example, if the gateway 22 (more specifically, the calculation control means in the gateway 22) determines that the data are received, the gateway 22 (more specifically, the calculation control means in the gateway 22) transfers the data to the control device 8 through the IP network 102 as shown in "SD101" in FIG. 5.

As a result, a plurality of gateways are provided between the wireless network and the IP network, and the wireless node searches a path from the gateway candidate list and selects a gateway on an optimal path to transfer data based on the information collected in the path search. Consequently, it is possible to select an optimum one of a plurality of gateways, thereby carrying out an interconnection between the networks.

Moreover, the wireless node selects the gateway on the optimal path based on the situation of the communication load of each of the gateways in the path search result list. Consequently, the increased communication loads can be distributed into a plurality of gateways, so that a countermeasure can be taken against the increase in the communication loads. Furthermore, the plurality of gateways are provided. Therefore, it is possible to enhance the degree of freedom of setting position of the gateway and that of the wireless node.

Although storing means is divided into two parts for the brief description with reference to FIGS. 7 and 8, it is a matter of course that the present invention may be implemented by one storing means.

While the interconnection between the wireless network and the IP network is illustrated in the description of the example shown in FIG. 1, moreover, it is a matter of course that networks other than an IP network may be employed, such as "Foundation Fieldbus" (registered trademark), "BACnet" (registered trademark) and "wireless Local Area Network (LAN)" to be controlling networks.

In the description of the example shown in FIG. 1, it is possible to apply any standard wireless network, irrespective of a simple notation of the wireless network. For example, it is a matter of course that "ZigBee (IEEE802.15.4)" (registered trademark) may also be applied.

Moreover, a path search algorithm is not restricted but any path search algorithm may be used.

In the case where a failure is detected in a data transferred to the selected gateway on the optimal path, moreover, the wireless node may retransfer the data to a gateway on a second optimal path. In this case, it is possible to enhance the reliability of the data transfer.

Furthermore, it is preferable to apply the example shown in FIG. 1 to the following systems:
(1) Plant control system; and
(2) Building automation system.

(1) In the plant control system, a large number of obstacles (facilities) are present in a plant building in which a wireless node is provided, and a radio wave hindrance is apt to be caused. Therefore, the wireless node selects an optimal path including an obstacle avoidance and a radio wave hindrance avoidance so that the robustness of the wireless network can be implemented and the reliability of the plant control system can be enhanced.

(2) In the building automation system, in the case where an illuminator or a switch is set to be a wireless node, a large number of obstacles (apparatuses or equipment) are also present inside a building where the wireless node is disposed, and a radio wave hindrance is also apt to be caused. The wireless node selects an optimal path including an obstacle avoidance and a radio wave hindrance avoidance so that the robustness of the wireless network can be implemented and the reliability of the system can be enhanced.

While there has been described in connection with the exemplary embodiments of the present invention, it will be obvious to those skilled in the art that various changes and modification may be made therein without departing from the present invention. It is aimed, therefore, to cover in the appended claim all such changes and modifications as fall within the true spirit and scope of the present invention.

What is claimed is:

1. A wireless network system for interconnecting a wireless network and another network different from the wireless network, comprising:
    a plurality of wireless nodes for establishing the wireless network;
    a control device connected to the other network; and
    a plurality of gateways for interconnecting the wireless network and the other network,
    wherein a wireless node of the plurality of wireless nodes, at a time of transmission of data, selects a candidate gateway from a gateway candidate list, performs a path search of a path for the candidate gateway to gather information on the path, selects a gateway on an optimal path based on the information collected in the path search, and transfers the data to the control device through the gateway on the optimal path.

2. The wireless network system according to claim 1, wherein the wireless node comprises:
    a wireless communication circuit that performs communication through the wireless network;
    a storage that stores the data, the gateway candidate list, a path search result list, a program for controlling the wireless node and information for searching a communication path; and
    controller that selects the candidate gateway to be used from the gateway candidate list, performs the path search for the candidate gateway to gather the information on the path, selects the gateway on an optimal path based on information collected in searching the path, establishes a transfer path to the gateway on the optimal path, and transfers data to the gateway on the optimal path using the established transfer path.

3. The wireless network system according to claim 1, wherein a gateway of the plurality of gateways comprises:
    a wireless communication circuit that performs communication through the wireless network;
    a storage that stores a program for controlling the gateway and information for a protocol conversion;
    a communication circuit that performs communication through the other network; and a controller that converts a protocol of data received through the wireless network and transfers the data to the control device via the other network.

4. The wireless network system according to claim 1, wherein the wireless node, for each transmission of data, searches a path from a gateway candidate list, selects a gateway on an optimal path based on information collected in searching the path, and transfers the data to the control device through the gateway on the optimal path.

5. The wireless network system according to claim 4, wherein the wireless node comprises:
   wireless communication circuit that performs communication through the wireless network;
   a storage that stores the data, the gateway candidate list, a path search result list, a program for controlling the wireless node and information for searching a communication path; and
   a controller that selects a gateway candidate to be used from the gateway candidate list, searches the path for the gateway candidate, selects the gateway on an optimal path based on information collected in searching the path, establishes a transfer path to the gateway on the optimal path, and transfers the data to the gateway on the optimal path using the established transfer path.

6. The wireless network system according to claim 1, wherein the information collected in the path search includes information about a situation of a communication load of each gateway.

7. A wireless network system for interconnecting a wireless network and another network different from the wireless network, the wireless network system comprising:
   a plurality of wireless nodes for establishing the wireless network;
   a control device connected to the other network; and
   a plurality of gateways for interconnecting the wireless network and the other network,
   wherein a wireless node of the plurality of wireless nodes searches a path from a gateway candidate list, selects a gateway on an optimal path based on information collected in searching the path, and transfers data to the control device through the gateway on the optimal path,
   wherein the wireless comprises:
      a wireless communication circuit carrying out a communication through the wireless network;
      storing means for storing the data, the gateway candidate list, a path search result list, a program for controlling the wireless node and information for searching a communication path; and
      a controller that selects selecting a gateway candidate to be used from the gateway candidate list, searching a path for the gateway candidate, selecting a gateway on an optimal path based on information collected in searching the path, establishing a transfer path to the gateway on the optimal path, and transferring data to the gateway on the optimal path by using the established transfer path, and
   wherein the wireless node retransfers data to a gateway on a second optimal path when detecting a failure in the data transfer to the gateway on the optimal path.

8. The wireless network system according to claim 7, wherein the other network is an IP network.

9. The wireless network system according to claim 7, wherein the wireless network system is applied to a plant control system.

10. The wireless network system according to claim 7, wherein the wireless network system is applied to a building automation system.

11. The wireless network system according to claim 7, wherein a gateway of the plurality of gateways comprises:
   a wireless communication circuit that performs communication through the wireless network;
   a storage that stores a program for controlling the gateway and information for a protocol conversion;
   a communication circuit that performs communication through the other network; and
   a controller that converts a protocol of data received through the wireless network and transfers the data to the control device via the other network.

12. The wireless network system according to claim 7, wherein the other network is an IP network.

13. The wireless network system according to claim 7, wherein the wireless network system is applied to a plant control system.

14. The wireless network system according to claim 7, wherein the wireless network system is applied to a building automation system.

* * * * *